(12) United States Patent
Kumar et al.

(10) Patent No.: US 10,089,631 B2
(45) Date of Patent: Oct. 2, 2018

(54) SYSTEM AND METHOD OF NEUTRALIZING MOBILE PAYMENT

(71) Applicant: CA, Inc., New York, NY (US)

(72) Inventors: Sharath Lakshman Kumar, Bangalor (IN); Mahesh Malatesh Chitragar, Bangalore (IN); Vishwanatha Salian, Bangalore (IN); Stephen Prasad, Karnataka (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/661,870

(22) Filed: Mar. 18, 2015

(65) Prior Publication Data
US 2016/0275513 A1 Sep. 22, 2016

(51) Int. Cl.
G06Q 20/00 (2012.01)
G06Q 20/40 (2012.01)
G06Q 20/36 (2012.01)
G06Q 20/34 (2012.01)

(52) U.S. Cl.
CPC ......... *G06Q 20/407* (2013.01); *G06Q 20/354* (2013.01); *G06Q 20/36* (2013.01); *G06Q 20/405* (2013.01)

(58) Field of Classification Search
CPC .. G06Q 20/407; G06Q 20/3266; G06Q 20/36; G06Q 20/405; H04L 9/0268
See application file for complete search history.

(56) References Cited

U.S. PATENT DOCUMENTS

| 7,472,829 B2 | 1/2009 | Brown | |
| 7,707,113 B1 | 4/2010 | DiMartino | |
| 7,922,082 B2 | 4/2011 | Muscato | |
| 8,387,866 B2 | 3/2013 | Hammad et al. | |
| 8,655,310 B1* | 2/2014 | Katzer | H04M 1/72519 455/410 |
| 9,237,146 B1 | 1/2016 | Casillas et al. | |
| 2005/0171898 A1 | 8/2005 | Bishop et al. | |
| 2007/0271149 A1 | 11/2007 | Siegel et al. | |
| 2008/0148042 A1* | 6/2008 | Brown | H04L 63/06 713/154 |
| 2008/0301461 A1 | 12/2008 | Coulier et al. | |
| 2011/0093351 A1 | 4/2011 | Afana | |
| 2011/0113245 A1 | 5/2011 | Varadarajan | |
| 2011/0184867 A1 | 7/2011 | Varadarajan | |
| 2011/0251892 A1 | 10/2011 | Laracey | |

(Continued)

OTHER PUBLICATIONS

Marwaha. "Apple Pay vs. Google Wallet: Lost and Stolen Scenario". Oct. 28, 2014. http://www.gmarwaha.com/blog/2014/10/28/apple-pay-vs-google-wallet-lost-and-stolen-scenario/.*

(Continued)

*Primary Examiner* — Thien M Le
*Assistant Examiner* — Asifa Habib
(74) *Attorney, Agent, or Firm* — Baker Botts L.L.P.

(57) ABSTRACT

A method for preventing mobile payment is described. The method comprises receiving an authorization request at an issuer system from a payment module on a mobile device. The authorization request may be based on sensitive data on the mobile device. The issuer system determines whether the mobile device is missing. The issuer system sends a neutralization trigger to the mobile device, and in response to receiving the neutralization trigger, the payment module is disabled.

17 Claims, 3 Drawing Sheets

(56) References Cited

U.S. PATENT DOCUMENTS

| | | | |
|---|---|---|---|
| 2011/0276417 A1* | 11/2011 | Campbell | G06Q 20/02 |
| | | | 705/16 |
| 2012/0109824 A1 | 5/2012 | Takatori et al. | |
| 2012/0129492 A1 | 5/2012 | Mechaley, Jr. | |
| 2012/0151566 A1 | 6/2012 | Lin et al. | |
| 2012/0153028 A1 | 6/2012 | Poznansky et al. | |
| 2012/0191569 A1 | 7/2012 | Shah | |
| 2012/0231736 A1* | 9/2012 | Amiel | G06Q 20/3227 |
| | | | 455/41.1 |
| 2012/0289343 A1* | 11/2012 | Pokonosky | G06Q 30/0242 |
| | | | 463/42 |
| 2012/0300927 A1* | 11/2012 | Choi | H04W 12/06 |
| | | | 380/247 |
| 2013/0048714 A1 | 2/2013 | Sharma et al. | |
| 2013/0159195 A1 | 6/2013 | Kirillin et al. | |
| 2013/0262317 A1 | 10/2013 | Collinger et al. | |
| 2014/0067683 A1 | 3/2014 | Varadarajan | |
| 2014/0143108 A1* | 5/2014 | Smith | G06Q 20/3229 |
| | | | 705/35 |
| 2014/0189359 A1 | 7/2014 | Marien et al. | |
| 2014/0250006 A1 | 9/2014 | Makhotin et al. | |
| 2014/0337236 A1 | 11/2014 | Wong et al. | |
| 2014/0373117 A1* | 12/2014 | Le Saint | G06F 21/33 |
| | | | 726/6 |
| 2015/0019425 A1* | 1/2015 | Kumar | G06Q 20/4016 |
| | | | 705/44 |
| 2015/0073996 A1 | 3/2015 | Makhotin et al. | |
| 2015/0095227 A1* | 4/2015 | Brozek | G06Q 20/4016 |
| | | | 705/44 |
| 2015/0178723 A1* | 6/2015 | Khan | G06Q 20/3821 |
| | | | 726/6 |
| 2015/0178724 A1* | 6/2015 | Ngo | H04L 9/0869 |
| | | | 705/71 |
| 2015/0180836 A1 | 6/2015 | Wong et al. | |
| 2015/0193764 A1* | 7/2015 | Haggerty | G06Q 20/3226 |
| | | | 705/44 |
| 2016/0036808 A1 | 2/2016 | Li | |
| 2016/0063476 A1 | 3/2016 | Baldie | |
| 2016/0085955 A1* | 3/2016 | Lerner | G06F 21/31 |
| | | | 726/20 |
| 2016/0253669 A1* | 9/2016 | Yoon | G06Q 20/4014 |
| | | | 705/75 |
| 2016/0253670 A1* | 9/2016 | Kim | G06Q 20/4012 |
| | | | 705/72 |

OTHER PUBLICATIONS

United States Patent and Trademark Office, Non-Final Office Action issued in U.S. Appl. No. 14/661,894, dated Oct. 20, 2017.
United States Patent and Trademark Office, Non-Final Office Action issued in U.S. Appl. No. 14/660,188, dated Dec. 22, 2017.
United States Patent and Trademark Office, Non-Final Office Action issued in U.S. Appl. No. 14/660,384, dated Dec. 22, 2017.
United States Patent and Trademark Office, Final Office Action issued in U.S. Appl. No. 14/660,240, dated Jan. 25, 2018.
U.S. Patent & Trademark Office, Non-Final Rejection issued in U.S. Appl. No. 14/660,333, dated Mar. 21, 2016.
U.S. Patent & Trademark Office, Non-Final Rejection issued in U.S. Appl. No. 14/661,894, dated Mar. 24, 2016.
U.S. Patent & Trademark Office, Final Rejection issued in U.S. Appl. No. 14/660,333, dated Jul. 27, 2016.
U.S. Patent & Trademark Office, Final Rejection issued in U.S. Appl. No. 14/661,894, dated Aug. 26, 2016.
U.S. Patent & Trademark Office, Non-Final Rejection issued in U.S. Appl. No. 14/661,894, dated Dec. 20, 2016.
U.S. Patent & Trademark Office, Non-Final Rejection issued in U.S. Appl. No. 14/660,333, dated Apr. 27, 2017.
U.S. Patent & Trademark Office, Final Rejection issued in U.S. Appl. No. 14/661,894, dated Jun. 29, 2017.
U.S. Patent & Trademark Office, Non-Final Rejection issued in U.S. Appl. No. 14/660,240, dated Jul. 14, 2017.
U.S. Patent & Trademark Office, Final Rejection issued in U.S. Appl. No. 14/660,333, dated Aug. 31, 2017.
Harbitter et al., "The Performance of Public Key-Enabled Kerberos Authentication in Mobile Computing Applications," Proceedings of the 8th ACM Conf. on Computer and Communications Security, Nov. 5-8, 2001, ACM.
Lin et al., "A Secure One-Time Password Authentication Scheme with Low-Computation for Mobile Communications," ACM Sigops Operating Systems Review, vol. 38, Issue 2, Apr. 2014, pp. 76-84.
Shin et al., "Micro-Payment System Using OTP for Customer's Anonymous," IEEE Xplore, May 2011.
João Pedro Sousa "Challenges and Architectural Approaches for Authenticating Mobile Users," Proceedings SAM'08, pp. 15-20, ACM, May 10, 2008.
U.S. Patent & Trademark Office, Notice of Allowance issued in U.S. Appl. No. 14/660,333, dated Apr. 17, 2018.
U.S. Patent & Trademark Office, Corrected Notice of Allowability issued in U.S. Appl. No. 14/660,333, dated May 1, 2018.
U.S. Patent & Trademark Office, Non-Final Office Action issued in U.S. Appl. No. 14/661,894, dated May 11, 2018.

* cited by examiner

SYSTEM AND METHOD OF NEUTRALIZING MOBILE PAYMENT

BACKGROUND

The present disclosure relates to contactless transactions and, in particular, to an apparatus, computer-readable medium, and method for preventing mobile payment.

SUMMARY

According to an embodiment of the present disclosure, a method comprising generating an authorization request, via a payment module, based on sensitive data on a mobile device, transmitting the authorization request from the payment module to an issuer system, receiving a neutralization trigger from the issuer system, and in response to receiving the neutralization trigger, disabling the payment module.

According to another embodiment of the present disclosure, a method comprising receiving, at an issuer system, an authorization request from a payment module, wherein the authorization request is based on sensitive data on a mobile device, determining whether the mobile device is missing, transmitting, via the issuer system, a neutralization trigger to the mobile device, and wherein the neutralization trigger disabled the payment module on the mobile device.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-3.

DETAILED DESCRIPTION

Figure 1:
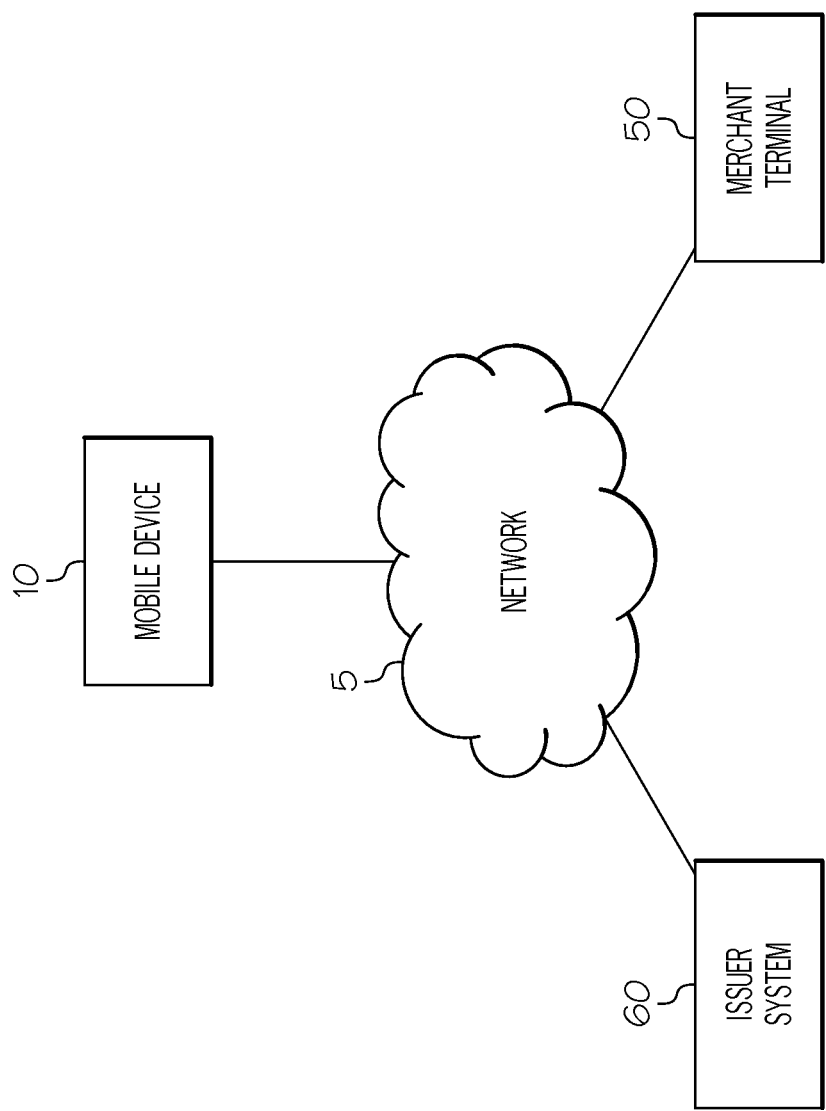
FIG. 1 is a schematic representation of the payment ecosystem in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to contactless transactions using a mobile device, systems and methods disclosed herein may also be related to contactless transactions utilizing credit cards, ticket scanning, transportation passes, and building access.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the last fifty years, credit cards have become an immensely popular method of payment for goods and services. This is due in large part to the advantages credit cards provide to both the cardholder and the merchant terminal. For example, credit cards often have magnetic strips that can contain a variety of information such as a cardholder's identity and account information. In addition, for example, credit cards offer cardholders and merchants the convenience of not having to carry or maintain large amounts of cash. Cardholders are also able to defer payment of a credit balance and purchase goods/services online securely using encrypted information.

As mobile devices have grown in popularity, consumers now desire the ability to complete transactions using mobile applications on mobile devices. Mobile phones can be used for making efficient payments via contactless transactions at a merchant terminal. However, the consumer's fear of stolen credit card data is as prevalent with mobile payments. Even though most mobile devices are protected by a pin, passcode, or finger print scan, the user is still at risk should an intruder overcome these protections.

Accordingly, there is a need in the marketplace for a system designed to provide a secure measure for a user's data on a mobile device, should that mobile device be misplaced or stolen. From an efficiency, security, and cost standpoint, the current disclosure provides an effective solution to this problem by, for example, remotely deleting the user's sensitive data on the mobile device.

Embodiments of the present disclosure can address the above problems, and other problems, individually and collectively.

In view of the recent expansion in mobile phone technology, the ability to use mobile phones to make mobile payments for goods and services has been an area of particular interest. There are basically two ways of conducting contactless mobile payments today that do not involve any cards or the swiping of such cards: Near Field Communications (NFC) based payments and Quick Response (QR) based payments. In NFC based transactions, a NFC-enabled device is capable of establishing wireless communication with another NFC-enable device by being brought into proximity with, without being touched to, the other device (e.g., the ability to tap a mobile device to a checkout terminal and the transaction is complete). In QR based transactions, a two-dimensional barcode, or matrix barcode, contains information about a transaction that can be read (i.e., processed) by a QR-code reading machine. For example, a QR code can be generated by a merchant, and a customer can use a mobile device and scan the QR code to complete the transaction; alternatively, the customer can generate a QR code, and the checkout terminal can scan the QR code to complete the transaction.

With regard to NFC-enabled devices being used in contactless payment methods, NFC-based payments can provide a more secure payment method compared with QR-based payments because NFC-based payments works on Europay, Mastercard and Visa (EMV) technologies, which is a global standard that defines a suite of protocols employing strong cryptograph for the interoperation of EMV-enabled cards with EMV-capable point of sale (POS) terminals and automated teller machines (ATMs) for authenticating transactions.

When a mobile device is used for making payments, either through NFC or QR based payments, all card data (e.g., card number, expiration data, billing address, and other relevant data) is encrypted and stored on the mobile device. A key used to encrypt the card data may be either camouflaged using CA ArcotID technology (found, for example, on www.ca.com), a key derived from a PIN known to the user, or stored in a secure element of the mobile device. In addition, an account unique key (AUKey) used to generated a dynamic card verification value (CVV) is stored either in a secure element of the mobile device, or camouflaged using CA ArcotID technology. In particular, a dynamic CVV is generated based on the AUkey, an unpredictable number, a card number, and an application transaction counter (ATC). The unpredictable number may be provided by the POS, by the issuer (e.g., the issuer of the credit card), or prefetched in a batch. For example, when the unpredictable number is provided by the issuer, the issuer can verify the dynamic CVV against the unpredictable number (which was sent by the issuer itself). The ATC is a counter maintained by a chip card application that provides a sequential reference to each transaction for fraud monitoring purposes. For example, a duplicate ATC, a decrease in ATC, or a large jump in ATC values may indicate data copying or other fraudulent activities on the card. In addition, for security purposes, the counter number is incremented by one, via the ATC, after each transaction, and the incremented counter number is stored in a memory (e.g., a memory 12 of the mobile device 10).

To make a payment, the payment module 14 needs to store sensitive card data like the Limited Use Key (LUK) and other data such as track 1 and track 2 data. The payment module 14 receives this card data from a supporting wallet server. The payment module 14 can store more than one card. The LUK and other data are used by the payment module 14 to generate a dynamic CVV number. This CVV number is sent to the merchant terminal 50 when the user taps the mobile device 10 on the NFC reader (or scans the QR code at the QR code reader) of the merchant terminal 50. This CVV number is then sent to the issuer system 60. The issuer system 60 verifies the CVV and either approves or rejects the payment.

The merchant terminal 50 may be active or passive. If the merchant terminal 50 is active, it is powered by electricity or another power source. If the merchant terminal 50 is passive, it does not require any electricity or power source, but can still communicate with a contactless enabled device by, for example, NFC electromagnetic induction. In addition, the merchant terminal 50 may also be a mobile device, a tablet, a computer system, a smartphone-based system, any other suitable receiving system, or any combination thereof. The payment infrastructure may also include an acquirer system and a payment network.

The LUK can be protected and stored in the mobile device 10. The LUK can also be camouflaged with a PIN of any length or format. The can be at least one LUK for each account, such as, for example, a credit card, associated with the mobile device 10. If there are multiple LUKs, they will all be camouflaged with the same PIN. Thus, because all the cards, and LUKs corresponding to the cards, are camouflaged with the same PIN, the user needs to remember only one PIN. Once the user enters the PIN into the mobile device 10, the user will be able to use any of the cards for payment.

In a typical NFC based payment, the mobile device is capable of connecting to the network (e.g., via the internet) to obtain the unpredictable number from the merchant terminal 50 in order to generate a dynamic CVV to complete a transaction. However, in QR based payment methods which typically do not have access to the network, the unpredictable number cannot "travel" from the merchant terminal 50 to the mobile device 10. According to an embodiment of the current disclosure, a cardholder initiates a transaction at a merchant terminal 50. The transaction can be a NFC transaction, a QR code transaction, or any other suitable type of transaction. The transaction can be contactless and can be initiated via a mobile device 10 such as, for example, a mobile phone. According to an embodiment of the current disclosure, the contactless transaction can be completed while the mobile device 10 is in an offline mode, in other words, the mobile device is not connected to the internet, telephone or data service, bluetooth, etc.

FIG. 1 is a schematic representation of the payment ecosystem in accordance with a non-limiting embodiment of the present disclosure. The payment ecosystem can include a mobile device 10, a network 5, a merchant terminal 50, and an issuer system 60.

Network 5 may comprises one or more entities, which may be public, private, or community based. Network 5 may permit the exchange of information and services among users/entities that are connected to such network 5. In certain configurations, network 5 may be a local area network, such as an intranet. Further, network 5 may be a closed, private network/cloud, in certain configurations, and an open network/cloud in other configurations. Network 5 may facilitate wired or wireless communications of information and provisioning of services among users that are connected to network 5.

The merchant terminal 50 may be local, online, or any other suitable configuration. For example, a local merchant terminal is considered in close proximity to a mobile device such that the user can perform a contactless transaction.

Figure 2:
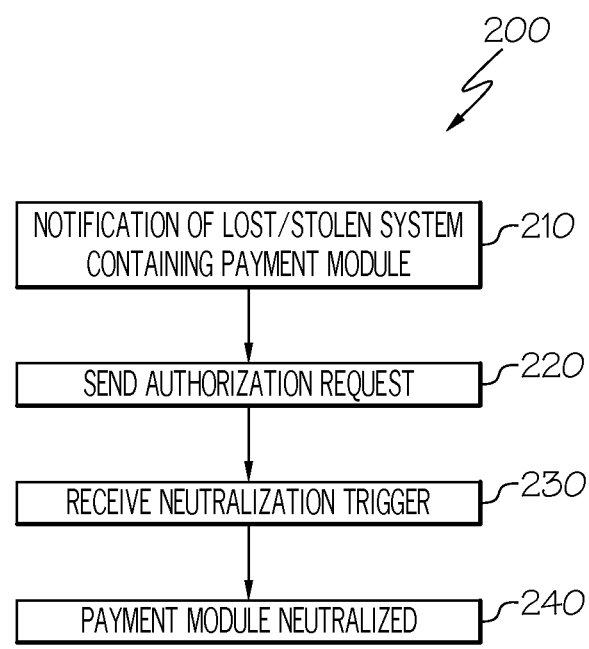
FIG. 2 illustrates a flow diagram depicting a method of neutralizing a payment module during a mobile transaction in accordance with a non-limiting embodiment of the present disclosure.

FIG. 2 illustrates a flow diagram 200 depicting a method of neutralizing a payment module during a mobile transaction in accordance with a non-limiting embodiment of the present disclosure. In step 210, the issuer system is notified of a lost or stolen system containing a payment module 14. The issuer can be notified by the original user of the phone, or by the mobile device 10 itself. Upon using the mobile device 10 to initiate a contactless transaction, the mobile device 10 sends an authorization request 30, via the payment module 12, to the issuer system 60 for example, as seen in step 220. In step 230, the mobile device 10 receives a neutralization trigger 40. In step 240, the payment module 14 is neutralized.

Neutralizing the payment module renders the payment module unable to complete the contactless transaction. The neutralization trigger 40 can render the payment module 14 ineffective by disabling the payment module 14, by deleting sensitive data on the payment module 14, by blocking the payment module 14 from transmitting information, by quarantining sensitive information on the payment module 14, by changing a pin or passcode, or any other suitable method. Sensitive data on the payment module 14 can include track 1 or track 2 data, limited use keys (LUKs), user information, card tokens, token expiry, issuer and card related information which aid in offline payments, card holder name and information, receipts, or any other payment related information.

Figure 3:
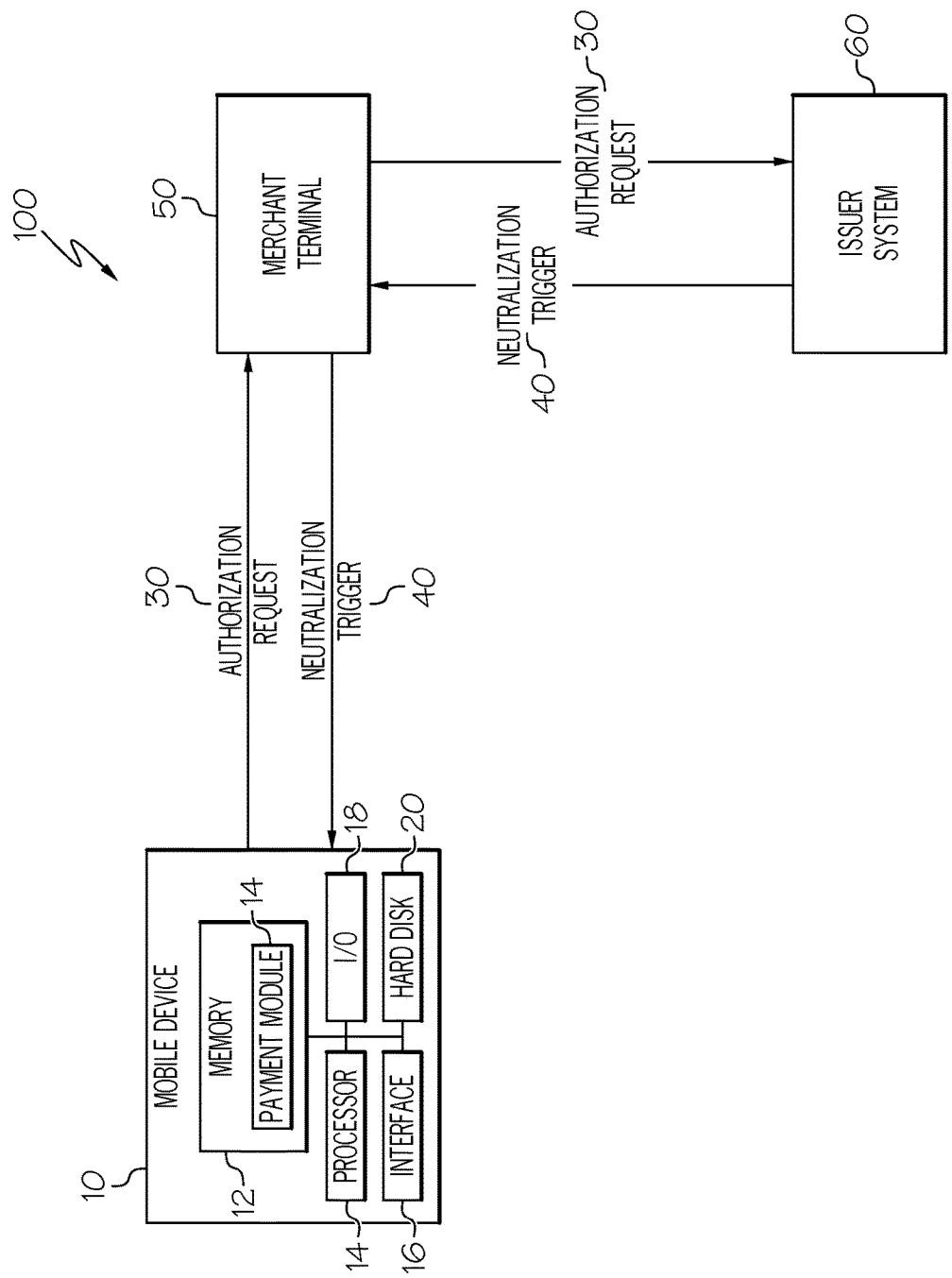
FIG. 3 illustrates a diagram displaying the interaction between a mobile device, merchant terminal and issuer system during a contactless transaction in accordance with a non-limiting embodiment of the present disclosure.

FIG. 3 illustrates a diagram 100 displaying the interaction between a mobile device, merchant terminal and issuer system during a contactless transaction in accordance with a non-limiting embodiment of the present disclosure.

The mobile device 10 can include a memory 12, payment module 14, input and output (I/O) device 18, hard disk 20, interface 16, and processor 14. Processor 14 may be operable to load instructions from hard disk 20 into memory 12 and execute those instructions. Memory 12 may store computer-readable instructions that may instruct the mobile device 10 to perform certain processes. I/O device 18 may receive one or more of data from network 5, merchant terminal 50, and issuer system 60.

The mobile device 10 can initiate a contactless transaction by sending an authorization request 30 to the merchant terminal 50. The merchant terminal 50 will then forward the authorization request 30 to the issuer system 60. The issuer system 60 can recognize that the authorization request 30 comes from a stolen device. Once the issuer system 60 is notified of the lost or stolen system and receives an authorization request 30 for a payment transaction, the issuer system 60 sends a neutralization trigger 40 to the merchant terminal 50. The merchant terminal 50 then forwards the neutralization trigger 40 to the mobile device 10, affectively neutralizing the payment module 14. The neutralization trigger 40 can be an Application Protocol Data Unit (APDU) command, a short message service (SMS), Issuer Update Processing (IUP), or any other suitable communication method. IUP can be an APDU command, proprietary to the issuer, and not necessarily understood by the merchant terminal 50. This process is also applicable for issuer systems that support Post Payment Processing. IUP can also modify data such as, for example, a pin on a contactless card.

An APDU command may also be sent through a payment network, acquirer system, or any other intermediary system. Similarly, the authorization request 30 may be sent through a payment network, acquirer system, or any other intermediary system.

In certain embodiments, the payment module 14 may send an authorization request 30 to an issuer system 60 via a cloud wallet service supporting the user. The cloud wallet service may communicated directly with the merchant terminal 50 and the issuer system 60 to transact payments.

The mobile device 10 can be NFC-enabled via an antenna. The payment module 14 on the mobile device 10 may act as a control interface for the cardholder during a contactless transaction. The payment module 14 may be the means with which the cardholder prepares the mobile device 10 for contactless transaction and the means with which the cardholder receives a display of payment confirmation. The payment module 14 can also be the means with which the cardholder initiates a mobile transaction. According to an embodiment of the current disclosure, the payment module 14 can be a mobile application installed on the mobile device 10. The payment module 14 can also be a digital wallet. In another embodiment of the disclosure, the payment module 14 can be a secure element device when the mobile device 10 is a contactless card.

Both the authorization request 30 and the neutralization trigger 40 may be encrypted or camouflaged. The payment module 14 may encrypt the authorization request 30 using CA technology such as, for example, cryptographic camouflage. Additionally, the issuer system 60 may encrypt the neutralization request 40 using CA technology such as, for example, cryptographic camouflage.

Cardholder transactions may also be executed through alternate channels. For example, consumers may use their credit cards to make purchases over the internet by typing in their credit card number and entering other personally identifiable information in order to authenticate the use of the card and allow the card issuing institution to authorize the transaction. These transactions may be referred to as "card not present" transactions. Other examples of card not present transactions include transacting credit card payments over phone lines, via mobile applications, mail order, and/or telephone order.

In certain embodiments of the present disclosure, the payment module 14 may interact with a merchant terminal 50 through an online channel. The issuer system 60 can then send a neutralization trigger 40 directly to the mobile device 10 and payment module 14, without having to use an intermediary.

The flowcharts depicted in FIGS. 1-3 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in transactions with a merchant terminal, but rather that embodiments of the invention may be used in any transaction having a need to receive confirmation notification of any type. The specification and the described examples are considered as exemplary only, with the true scope and spirit of the invention indicated by the following claims.

What is claimed is:

1. A method, comprising:
receiving, at an issuer system, an authorization request from a payment module, wherein the authorization request is based on a limited use key on a mobile device, and wherein the authorization request originates from a contactless transaction between the payment module on the mobile device and a merchant terminal, wherein the merchant terminal communicates with the mobile device via electromagnetic induction;
determining whether the mobile device is missing;
encrypting a neutralization trigger prior to transmitting the neutralization trigger to the mobile device;
transmitting, from the issuer system via the merchant terminal, the neutralization trigger to the mobile device;
wherein the limited use key is camouflaged with a user PIN;
wherein the limited use key is used to generate a dynamic CVV number; and
wherein the neutralization trigger disables the payment module on the mobile device by deleting the limited use key on the mobile device.

2. The method of claim 1, wherein the mobile device is offline when receiving the neutralization trigger.

3. The method of claim 1, wherein disabling the payment module comprises deleting the sensitive data on the payment module.

4. The method of claim 1, wherein the neutralization trigger is an Application Protocol Data Unit command.

5. The method of claim 1, wherein the limited use key is a one-time key associated with a credit card account.

6. The method of claim 1, wherein the neutralization trigger is operable to block the payment module from transmitting information.

7. A computer configured to access a storage device, the computer comprising:
   a processor; and
   a non-transitory, computer-readable storage medium storing computer-readable instructions that when executed by the processor cause the computer to perform:
      receiving, at an issuer system, an authorization request from a payment module, wherein the authorization request is based on a limited use key on a mobile device, and wherein the authorization request originates from a contactless transaction between the payment module on the mobile device and a merchant terminal, wherein the merchant terminal communicates with the mobile device via electromagnetic induction;
      determining whether the mobile device is missing;
      encrypting a neutralization trigger prior to transmitting the neutralization trigger to the mobile device;
      transmitting, from the issuer system via the merchant terminal, the neutralization trigger to the mobile device;
      wherein the limited use key is camouflaged with a user PIN;
      wherein the limited use key is used to generate a dynamic CVV number; and
      wherein the neutralization trigger is operable to quarantine sensitive information on the mobile device, and disable the payment module on the mobile device by deleting the limited use key on the mobile device.

8. The computer of claim 7, wherein the mobile device is offline when receiving the neutralization trigger.

9. The computer of claim 8, wherein disabling the payment module comprises preventing use of the payment module.

10. The computer of claim 7, wherein the neutralization trigger is an Application Protocol Data Unit command.

11. The computer of claim 7, wherein the limited use key is a one-time key associated with a credit card account.

12. The computer of claim 7, wherein the neutralization trigger is operable to block the payment module from transmitting information.

13. A computer program product comprising:
   a computer-readable storage medium having computer-readable program code embodied therewith, the computer-readable program code comprising:
      computer-readable program code configured to receive, at an issuer system, an authorization request from a payment module, based on a limited use key on a mobile device, the authorization request based on sensitive data on a mobile device, and wherein the authorization request originates from a contactless transaction between the payment module on the mobile device and a merchant terminal, wherein the merchant terminal communicates with the mobile device via electromagnetic induction;
      computer-readable program code configured to determine whether the mobile device is missing;
      computer-readable program code configured to encrypt a neutralization trigger prior to transmitting the neutralization trigger to the mobile device;
      computer-readable program code configured to transmit, from the issuer system via the merchant terminal, the neutralization trigger to the mobile device wherein the neutralization trigger is operable to delete sensitive information data on the mobile device and disable the payment module on the mobile device by deleting the limited use key on the mobile device;
   wherein the limited use key is used to generate a dynamic CVV number; and
   wherein the limited use key is camouflaged with a user PIN.

14. The computer program product of claim 13, wherein the mobile device is offline when receiving the neutralization trigger.

15. The computer program product of claim 14, wherein disabling the payment module comprises deleting the sensitive data on the payment module.

16. The computer program product of claim 13, wherein the limited use key is a one-time key associated with a credit card account.

17. The computer program product of claim 13, wherein the neutralization trigger is operable to block the payment module from transmitting information.

* * * * *